(12) United States Patent
Nguyen et al.

(10) Patent No.: US 12,505,377 B2
(45) Date of Patent: Dec. 23, 2025

(54) SYSTEM AND METHOD FOR ASSIGNING PERFORMANCE DEFECTS TO SOFTWARE PROCESSING COMPONENTS

(71) Applicant: EMC IP Holding Company LLC, Hopkinton, MA (US)

(72) Inventors: Tuan Anh Nguyen, San Jose, CA (US); Shashikanth Lakshmikantha, San Jose, CA (US); Philip Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1239 days.

(21) Appl. No.: 17/236,892

(22) Filed: Apr. 21, 2021

(65) Prior Publication Data

US 2022/0343206 A1 Oct. 27, 2022

(51) Int. Cl.
*G06N 3/09* (2023.01)
*G06F 11/3604* (2025.01)
*G06F 16/17* (2019.01)
*G06N 20/00* (2019.01)

(52) U.S. Cl.
CPC ......... *G06N 20/00* (2019.01); *G06F 11/3612* (2013.01); *G06F 16/1734* (2019.01); *G06N 3/09* (2023.01)

(58) Field of Classification Search
CPC .............. G06F 11/3612; G06F 16/1734; G06F 11/3447; G06F 11/3409; G06F 2201/865; G06F 11/302; G06N 3/0895
See application file for complete search history.

(56) References Cited

U.S. PATENT DOCUMENTS

| 10,216,558 | B1* | 2/2019 | Gaber | G06F 11/0727 |
| 2021/0406727 | A1* | 12/2021 | Wang | G06N 5/04 |
| 2022/0019496 | A1* | 1/2022 | Lozano | G06F 11/0781 |

(Continued)

OTHER PUBLICATIONS

Zhang et al., "Software Component Prediction for Bug Reports", 2019, Proceedings of Machine Learning Research vol. 101, pp. 806-821.

(Continued)

*Primary Examiner* — Sanchita Roy
(74) *Attorney, Agent, or Firm* — WOMBLE BOND DICKINSON (US) LLP

(57) ABSTRACT

Embodiments of the present disclosure relate to a method, a system, and a non-transitory machine-readable medium for assigning performance defects to software processing components. Provided is a method that receives performance data of a set of performance runs of a software application across a set of software processing components of a file software system, where the performance data comprises multiple labeled performance features that are associated with the set of software processing components; receives, from a software processing component expert, a user-selection of a subset of labeled performance features of the several labeled performance features; and trains a machine learning (ML) model to determine whether one or more of the set of software processing components is associated with performance regressions of the software application, using the subset of labeled performance features of the performance data as training data.

20 Claims, 6 Drawing Sheets

(56) References Cited

U.S. PATENT DOCUMENTS

2022/0129337 A1* 4/2022 Hermanns .............. G06N 20/00
2022/0391643 A1* 12/2022 Mansour ............. G06F 18/2178

OTHER PUBLICATIONS

Lu et al., "Making Disk Failure Predictions SMARTer!", Proceedings of the 18th USENIX Conference on File and Storage Technologies (FAST '20) Feb. 25-27, 2020.
Castelluccio et al., "Teaching machines to triage Firefox bugs", Apr. 9, 2019, available online at <https://hacks.mozilla.org/2019/04/teaching-machines-to-triage-firefox-bugs/>.

* cited by examiner

SYSTEM AND METHOD FOR ASSIGNING PERFORMANCE DEFECTS TO SOFTWARE PROCESSING COMPONENTS

FIELD

Embodiments of the present disclosure relate generally to file systems. More particularly, embodiments of the disclosure relate to a system and method for assigning performance defects to software processing components. Other embodiments are also described.

BACKGROUND

Data Domain (DD) storage solutions provide for migrating of files from local (e.g., client) storage devices to object storage located in the cloud for long term retention and cost savings. The data can be de-duplicated and stored as compressed data segments.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment of this disclosure are not necessarily to the same embodiment, and they mean at least one. Also, in the interest of conciseness and reducing the total number of figures, a given figure may be used to illustrate the features of more than one embodiment, and not all elements in the figure may be required for a given embodiment.

DETAILED DESCRIPTION

Figure 1:
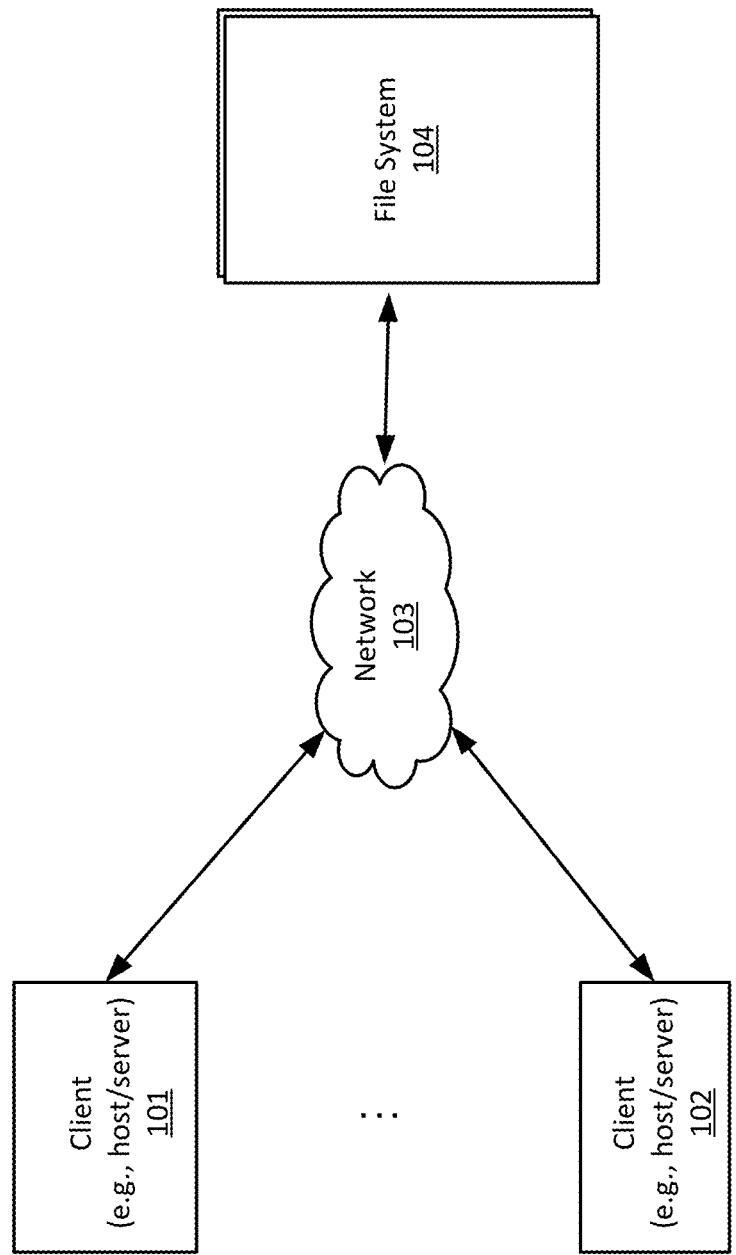
FIG. 1 is a block diagram illustrating a file system according to one embodiment.

Several embodiments of the disclosure with reference to the appended drawings are now explained. Whenever the shapes, relative positions and other embodiments of the parts described in a given embodiment are not explicitly defined, the scope of the disclosure here is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

File systems, such as data domain file systems (DDFSs), may periodically release new software and/or release updates to existing software. With some releases, however, software may not perform as intended due to a software bug (e.g., an error or flaw in its source code). This may be referred to a performance (or software) regression in which the software may not function or may still function correctly, but may perform slower or may use more memory or resources (e.g., processor(s), etc.) than intended. Specifically, software may span across various software processing components of a file system. For example, software for allowing a user (e.g., at a client device) to read and write data (e.g., files) into data storage of a file system may use (or have) software processing components of the file system, such as a protocol layer (e.g., a Network File System (NFS) protocol that allows the client device to access files in the data storage, etc.) and a storage layer that includes an application programming interface (API) for reading and writing (storing) data (e.g., in physical memory). These software components may share common resources (e.g., across one or more servers of the file system), such as one or more processors, memory, a network interface, etc. Because software components may share common resources, one defective component may cause other components to under-utilize or over-utilize resources. As a result, many software components may perform defectively or inefficiently, and therefore it is very difficult to pinpoint the defective component where the root cause lies.

One way to combat the issue is to perform a performance analysis of a performance regression of the software, and to assign the regression of a (e.g., defective) component to an engineer (or technician) who specializes in the component for further analysis to solve the problem. This performance analysis, however, may be a slow and laborious task. For instance, during performance runs of software, large amounts of structured and unstructured data may be collected by the file system. Several software engineers may then manually analyze the collected data to troubleshoot performance issues. Once a potential defective component is found, the problem may then be assigned to one or more component experts (or specialists) for further analysis in order to correct the issue. Analyzing such large amounts of data is a time intensive process. Moreover, with time restrictions and limited personal, such an analysis may not be done for every identified problem. This may result in software bugs lingering within the code, which may continue to cause performance issues. Even when the performance analysis is performed, however, some software components may be erroneously identified as defective. As previously described, some components may be defective as a result of another defective component, while not actually being the root of the problem. Thus, the manual assignment of a defective component may be incorrect, and as a result a considerable amount of time may be wasted by a component specialist analyzing and debugging the presumed defective component, while the root problem remains unresolved.

Embodiments of the present disclosure address the above, and other issues of assigning performance defects to software processing components. In particular, the present disclosure provides an automated method for performance defect discovery in which a machine learning (ML) model detects performance regressions for assigning the issue to an appropriate component specialist. Specifically, performance data of several performance runs of a software application is received, where the data includes several labeled performance features that are associated with software processing components. For example, a labeled performance feature may include a clock speed of one or more processors that were executing instructions of a software processing component and/or indicate whether the clock speed includes a fault or regression (e.g., indicating that the speed is below a performance threshold). Since several software processing components (and/or hardware resources) may be used for executing a software application, the number of labeled performance features may be extremely large (e.g., 1,000's of features). Training a ML model with so many features, however, may require a considerable amount of processing time. Therefore, in order to accelerate the training process, a human expert (or specialist) may trim the number of features to a more manageable number (e.g., ~100 features). In addition to accelerating the training process, the human expert is able to identify important features, while discarding features that are not as important. The ML model is thus trained to determine whether one or more software processing components is associated with performance regressions of the software application, using the trimmed features of the performance data as training data. Once trained, the ML model may be used to determine whether a software processing component has a performance defect based on performance data of a performance regression of the software application. As a result, defective software processing components may be accurately identified and assigned to component specialists in an efficient and timely manner.

According to one embodiment, a method including receiving performance data of a set of performance runs of a software application across a set of software processing components of a file software system, wherein the performance data comprises a plurality of labeled performance features that are associated with the set of software processing components; receiving, from a software processing component expert, a user-selection of a subset of labeled performance features of the plurality of labeled performance features; and training a machine learning (ML) model to determine whether one or more of the set of software processing components is associated with performance regressions of the software application, using the subset of labeled performance features of the performance data as training data.

In some embodiments, at least one of the set of performance runs of the software application is a performance regression in which one or more software processing components of the set of software processing components performed below a performance threshold. In another embodiment, the subset of labeled performance features are associated with a subset of the one or more software processing components that are responsible for the performance regression. In one embodiment, the method further includes generating synthetic performance data using the subset of labeled performance features, wherein the training data further comprises the synthetic performance data. In another embodiment, the user-selection of the subset of labeled performance features reduces the performance data used as training data by removing data associated with the unselected labeled performance features, wherein the synthetic performance data includes more data of the subset of labeled performance features than the reduced performance data. In some embodiments, the method further includes identifying labeled performance features of the subset from a performance run of the set of performance runs that is not a performance regression of the software application, wherein generating the synthetic performance data comprises varying each of the identified labeled performance features from the performance run within a predefined range.

In another embodiment, the ML model is one of a decision tree, a random forest, a recurrent neural network (RNN), a long short term memory (LSTM) neural network, and a multi-head attention. In some embodiments, each labeled performance feature indicates a usage of a resource of an electronic device by a software processing component during a performance run of the software application.

According to another embodiment, a non-transitory machine-readable medium having instructions stored therein, which when executed by a processor, cause the processor to perform operations, the operations including at least some of the operations described herein.

According to another embodiment, a method including receiving performance data of a performance regression of a software application across a set of software processing components of a file software system; and determining, using a machine learning (ML) model that has an input based on the performance data of the performance regression, a software processing component of the set of software processing components that has a performance defect, wherein the performance data includes a plurality of labeled performance features that are associated with the set of software processing components, wherein the ML model has been trained using a subset of the labeled performance features that have been user-selected from the plurality of labeled performance features as training data.

In one embodiment, the subset of labeled performance features are associated with a subset of software processing components, wherein the determined software processing component is a part of the subset. In another embodiment, the set of software processing components comprises at least one of a protocol layer, a file manager, a content store, a segment store, a container manager, and a storage layer. In some embodiments, the method further includes assigning the performance defect to a user who specializes in the software processing component.

FIG. 1 is a block diagram illustrating a file system 104 according to one embodiment. Referring to FIG. 1, system 100 includes, but is not limited to, one or more client systems 101-102 communicatively coupled to the file (e.g., DDFS) system 104 over a network 103. The client systems may be any type of electronic devices, such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as file system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102. The file (or storage) system 104 may include or represent any type of servers or a cluster of one or more servers (e.g., cloud servers). For example, file system 104 may be a storage server used for various different purposes, such as to provide multiple users or client systems with access to shared data and/or to back up (or restore) data (e.g., mission critical data). More about the file system is described herein.

Figure 2:
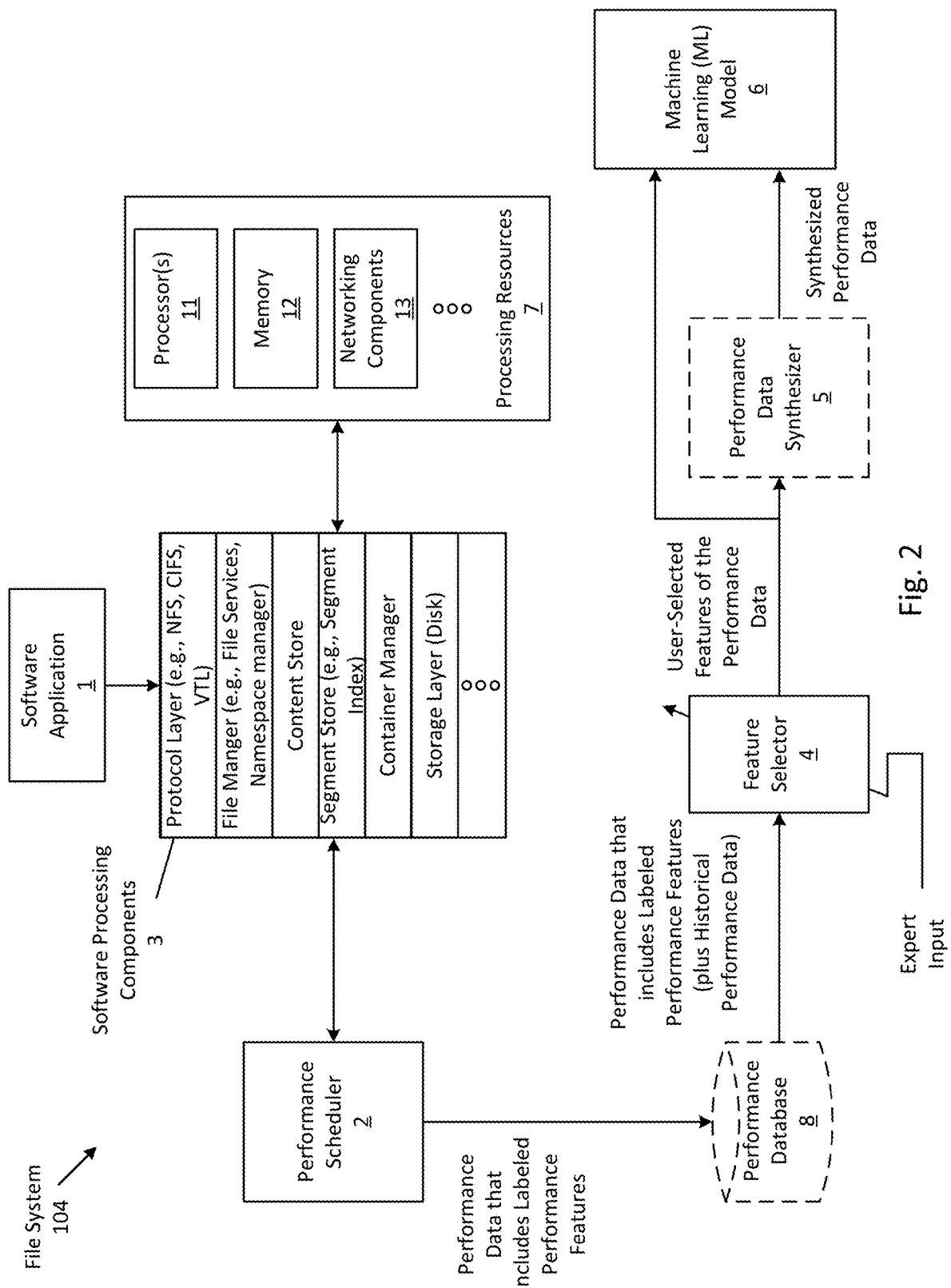
FIG. 2 shows a block diagram of the file system in which a machine learning (ML) model is trained for assigning performance defects to software processing components according to one embodiment.

FIG. 2 shows a block diagram of the file system 104 in which a machine learning (ML) model is trained for assigning performance defects to software processing components according to one embodiment. Specifically, this figure shows several operational blocks, such as a software application 1, a performance scheduler 2, one or more software processing components 3, a feature selector 4, a performance data synthesizer 5, and a ML model 6, one or more processing (e.g., hardware) resources 7, and a database 8. In one embodiment, each of the operational blocks 1-6 and/or the database 8 may be implemented in hardware, software, or a combination thereof. For example, the performance database and the storage layer of the software processing components may at least partially be implemented in memory 12 of resources 7.

Processing resources 7 include one or more processor(s) 11, memory 12, and networking components 13, interconnected via a network, or other hardware. In one embodiment, the resources may include more (or less) resources. Processor(s) 11 may be general purpose processor(s), arithmetic coprocessors, application specific processors, programmable logic units, or other hardware processor. Memory can include read-only memory (ROM), random access memory (RAM), flash memory, non-volatile memory such as 3DXP (3D cross-point), battery backed RAM, or other memory. Memory 12 can be programmed with, or have access to, one or more executable programs that implement one or more of the operational blocks 1-6 and/or the database 8. Networking components 13 may include one or more network interfaces, protocol stacks, interconnections, and other networking hardware. In one embodiment, the processing resources may be a part of at least one computer node (or server). In another embodiment, at least some of the resources may be a part of several electronic devices, where the devices are communicatively coupled (e.g., via networking components).

The software processing components 3 include a stack of various components (or modules) that are used by (e.g., one or more computer nodes of) the file system. For example, the protocol layer, which may include any file-based access protocols (e.g., for allowing users or client devices access to shared data and/or to back up (or restore) data), such as a network file system (NFS) protocol, a common Internet file system (CIFS) protocol, virtual tap library (VTL) protocol, etc. In another embodiment, this layer may also include the small computer system interface (SCSI) protocols, Internet SCSI or iSCSI, and Fibre channel (FC) protocol, etc. Storage system may further provide storage services via an object-based protocol and Hadoop distributed file system (HDFS) protocol. In another embodiment, the protocol layer may include any protocol used (or required) by the file system. The file manager is for performing file maintenance operations and file services in the file system. The manager may also include a namespace manager that organizes and manages the files (and other resources) into hierarchical namespaces. The content store is configured to provide a mapping of a (e.g., segmented) file, and may store a block map of the file. The segment store is configured to manage and maintain the segments of data. In one embodiment, the segment store deduplicates data divided into segments based on a segment "fingerprint", which may be a digital signature (e.g., hash function), that is stored and managed in a segment index (e.g., as metadata). In some embodiments, the metadata may indicate the location (e.g., whether stored locally or remotely) of the associated segment. The container manager is configured to take segments indexed by the file system and/or the segment store and stores them into one or more containers. The container manager may also keep track and manage the containers (e.g., based on whether a user reads/writes data segments contained therein). The storage layer is configured to provide APIs to write data to one or more disks (e.g., memory 12). In one embodiment, the file system may include more or less components.

The software application 1 is a program, which when executed by (e.g., at least some of the processing resources 7 of) the file system 104 performs one or more functions across at least some of the software processing components 3, as described herein. For example, a build of the software application may perform a read/write function, allowing a client device (e.g., 101) to access data stored in (e.g., memory 12 of) the file system using one or more of the components. The application may be any program that is executable by the file system and/or any device that may be communicatively coupled to the system, such as client device 101. In another embodiment, the application may be executable on a stand-alone electronic device. In one embodiment, the application (e.g., source code) may not be known to have any regression (e.g., software bugs), such as a final version of the application for release. In another embodiment, software bugs may have been purposely added (by being programmed) into the source code (or may have been inadvertently added into the source code), thereby resulting in a software regression when executed. Specifically, the software regression may induce a particular software processing component that is used during execution of the application to have a fault.

In one embodiment, the file system 104 is configured to perform one or more performance (benchmark) runs of the application across one or more of the software processing components 3. Specifically, the application may be deployed (e.g., by the file system) on one more platforms (e.g., operating systems of one or more servers), and builds of the application may be run across (or using) the software components. In one embodiment, the scheduler collects (or receives) performance data that include performance statistics (or features) that indicate the performance of one or more software processing components 3 with respect to the processing resources 7 during a benchmark run. For example, when the benchmark run is an iOPS benchmark run, the performance data may include features that indicate the speed and efficiency at which the content store reads data from memory 12. As another example, the performance data may include statistics of the processor(s) 11, such as a clock speed of one or more processors 11 that are executing the software processing components. In another embodiment, the performance data may include statistics of the networking components interface 13, such as bandwidth, packet loss, throughput, etc. In one embodiment, performance runs may be across two or more different change sets in the application. As a result, the file system may perform different benchmark runs in which the scheduler collects different sets of features. In one embodiment, at least one of the performance runs of the software application is a performance regression. If a benchmark run has a performance regression, then the features collected across the processing components may help recognize a defective component, as described herein.

In one embodiment, the performance data may include one or more performance logs (e.g., n-dimensional feature vectors), each log associated with at least one performance run. In some embodiments, the performance logs include data (e.g., values) associated with one or more features to indicate the performance during a run. In one embodiment, different performance logs may include different features, based on the performance run.

In one embodiment, the performance scheduler 2 is configured to label the performance runs (or performance logs), where the labels indicate whether a performance run has a desired performance or not. For example, the scheduler may compare a feature (e.g., a speed at which the content store reads data from memory 12) of a performance run with respect to a performance threshold. If the software processing component performed below the performance threshold, the scheduler may label the performance run as a performance regression. In addition to, or in lieu of, labeling the performance run as a performance regression, the scheduler may label one or more performance features collected from one or more performance runs (e.g., of the associated performance log) that are at fault. In one embodiment, the performance scheduler may label the performance run (and/or the performance features) as a performance regression, based on whether the build of the application included a software bug or not. Otherwise, the performance scheduler may label the performance run (and/or the feature) as satisfactory. In some embodiments, the labeled performance features may indicate statistics of associated software components and whether the components are at fault. For instance, at least one labeled performance features may indicate a usage of a resource of an electronic device (e.g., one or more processors 11 of a server of the file system) by a software processing component during a performance run of the software application. In another embodiment, the performance scheduler may label the features based on user input (e.g., via a user input device that is communicatively coupled with the file system).

The performance database 8 is configured to receive the performance data that may include several labeled performance features that are associated with the software processing components, and store the performance data.

The feature selector 4 is configured to receive the performance data that includes labeled performance features from the performance database 8 (and/or from the performance scheduler 2). In one embodiment, the selector may also receive historical performance data (e.g., performance data previously collected by the performance scheduler 2 and stored in the database). The feature selector is configured to receive a user-selection (e.g., as user input from a user device) of a subset of labeled performance features of the features received in the performance data. For example, a user device may display a graphical user interface (GUI) that includes the performance data (e.g., as a table), where the user may select (via an input device), one or more features. Specifically, the performance data may include a significant number of labeled performance features (e.g., 1,000's of features). In one embodiment, the subset of features may be significantly less than the total number of features in the performance data, such as between 10-100 features. Thus, the selection of the features may reduce the performance data substantially (e.g., by removing the unselected features and data associated with the features).

In some embodiments, some features may be more important than others when used as training data for the ML model 6. A user (e.g., a domain expert or specialist) may have a key insight as to which features are more important to determine the root cause of a problem that is resulting in the performance regression. For instance, the expert may specialize in one or more of the software processing components 3, and may look at certain key problem patterns based on statistics that identify such patterns. In addition, the user may take "logical jumps" based on past experiences. For example, the user may select features that are not related to one another (e.g., features of different software processing components and/or different processing resources). In one embodiment, by having the user select key features, the training process of the ML model may be accelerated immensely. In another embodiment, however, rather than (or in addition to) a user selecting at least some of the features, the feature selector 4 may automatically (e.g., without user intervention) select one or more of the features.

In one embodiment, the subset of features may all be features that have been identified as having a fault (or being responsible for the performance regression based on the performance data). For example, of the labeled performance features (e.g., 10,000), at least some (e.g., 1,000) have been labeled as having a fault. The selection may be less than (or all of) the labeled performance features having been identified with at least one fault (e.g., the user selection may be 40 of the 1,000). In another embodiment, at least some of the features may have at least one or no faults over one or more performance runs. In other words, some features may be associated with one or more performance regressions, or may be associated with none at all.

In one embodiment, the feature selector 4 may perform one or more data processing operations upon the performance data. In particular, the received performance data (and historical data) may be in different formats (e.g., tables, etc.), and/or may be missing data. As described herein, different performance runs may result in performance data with different performance features. As a result, the performance data may be missing data for features across one or more performance runs. Thus, the feature selector may be configured to perform data cleaning operations to address the inconsistent data. For example, the selector may remove features that have very little or no data. As another example, rather than removing features, the selector may add data associated with performance runs that did not collect data for a particular feature. In another embodiment, the feature selector may perform data normalization operations, such that data values associated with the features are normalized within a range (e.g., between 0-1). In another embodiment, the selector may perform other data cleaning operations. In some embodiments, the feature selector may perform these operations before (or after) the user-selection of the features. In one embodiment, the processed performance data may be imported into one or more tables that may be stored in memory (e.g., memory 12).

In one embodiment, the user-selection of the subset of features reduces the performance data that may be used as training data by removing data associated with unselected features. With this reduction of the performance data, the ML model 6 may have a high variance and low bias. Specifically, low bias may relate to achieving a good accuracy when using the remaining performance data as training data, and high variance means that the trained model may have a low accuracy for unseen data or real data used as input to the trained model, as described herein. In order to have low variance, the ML model may require a significant amount of training data (e.g., above a threshold, or above the data associated with the selected features). In one embodiment, the performance data synthesizer 5 is configured to receive the user-selected (subset of performance) features of the performance data, and is configured to generate synthetic performance data using the user-selected features for training the ML model 6. For example, the synthesizer identifies labeled performance features of the subset from a performance run that is not a performance regression. For instance, the synthesizer may identify that the performance run (e.g., a performance log of the data) has not been labeled as a performance run. In another embodiment, the identification may be based on the labeled features, such as identifying that none (or at least some) features of a performance run do not include a fault. The identified (features of the) performance run may be a baseline. In one embodiment, the data of the other performance runs may be normalized against the baseline. In some embodiments, the normalized data may be stored in one or more data files, such as a comma-separated values (CVS) file. Synthetic performance data is then generated by varying each of the identified features from the baseline performance run within a predefined range (e.g., 1%, 5%, 10%, etc.). In some embodiments, the generated synthetic data may be significantly larger (e.g., 1000 times larger) than the performance data of the subset of labeled performance features selected by the user. In other words, the synthetic performance data may include more data of the subset of features than the reduced performance data received from the feature selector.

The ML model 6 is configured to receive the performance data of the user-selected features and/or the synthesized performance data, and is configured to be trained to determine whether one or more software processing components is associated with performance regression of the software application (or any software application, using the data as training data. Specifically, the data is provided to the ML data to learn from. In one embodiment, at least some of the data may be used to train the ML model, while other data may be used as validation data for validating the trained ML model and/or may be used as testing data for testing how well the trained model operates. In one embodiment, the ML model may be one of a decision tree, a random forest, and a multi-head attention. In another embodiment, the ML model may be a recurrent neural network (RNN), such as a one-to-one RNN, one-to-many RNN, etc. In some embodiments, the ML model may be a long short-term memory (LSTM) neural network, which is a type of RNN that includes forget gates. is either a RNN or a LSTM neural network. In some embodiments, the ML model may be any type of machine learning algorithm.

In one embodiment, at least one of the elements of the file system 104 may be omitted (or optional), as illustrated as having a dashed boundary. For example, the file system 104 may not include a performance database 8, in which case the feature selector 4 may obtain the performance data from the performance scheduler 2 (without the historical data). In another embodiment, the performance data synthesizer 5 is optional. In which case, the ML model 6 may be trained with (at least some of) the performance data of the user-selected labeled performance features (from the feature selector).

Figure 3:
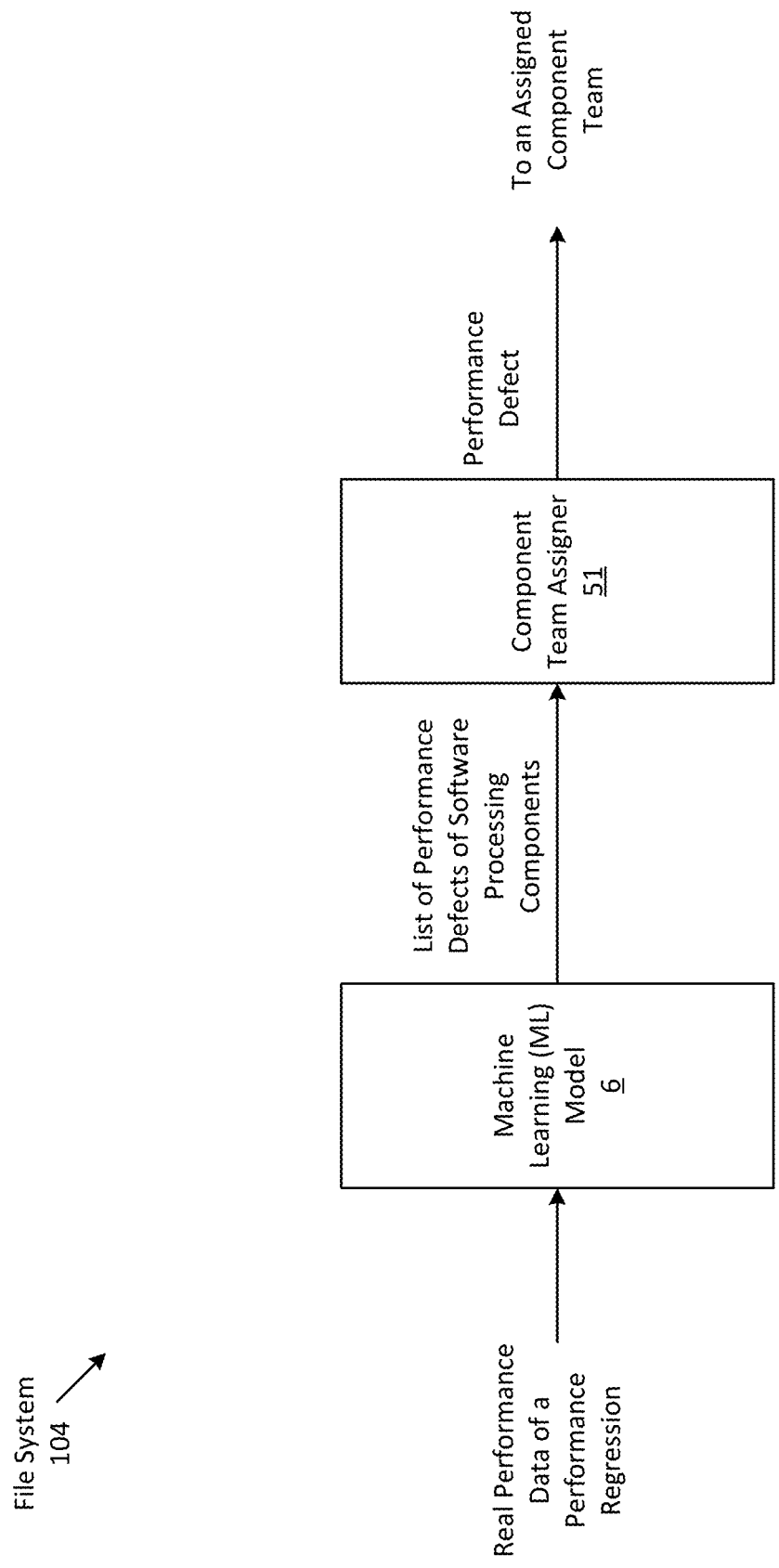
FIG. 3 shows a block diagram of the file system in which the ML model is used to assign a performance defect to a software processing component in response to a performance regression as input according to one embodiment.

FIG. 3 shows a block diagram of the file system 104 in which the ML model 6 is trained and used to assign a performance defect to a software processing component in response to a performance regression as input according to one embodiment. Specifically, the trained ML model 6 is configured to receive (real) performance data of a performance regression of the software application across the software processing components 3 of the file system. In one embodiment, the performance data may be of a performance run of the software application that included one or more performance regressions, as described herein. The trained ML model is configured to determine based on the real performance data of the performance regression a list of (or one or more) performance defects of one or more software processing components used to execute the performance run of the software application. Specifically, the model determines at least one software processing component (e.g., of components 3) that has a performance defect. In one embodiment, the software processing component that is determined to have a performance defect may be a component that is associated with at least one user-selected labeled performance feature that was used as training data for the ML model.

In one embodiment, the component team assigner 51 is configured to receive the list of performance defects and is configured to assign the performance defect to a component team (or user) who specializes in the software processing component that has the defect. For example, the assigner may use the (performance defects listed in the) list to perform a table lookup into a data structure that associates software processing components with component teams. In another embodiment, the data structure may associate performance defects of the components with one or more component teams. Upon identifying a match, the assigner may assign the performance defect the team (or teams). In one embodiment, although illustrated as being separate from the ML model 6, the assigner 51 may be a part of the ML model 6, such that the ML model is configured to determine and assign the performance defect, as described herein.

Figure 4:
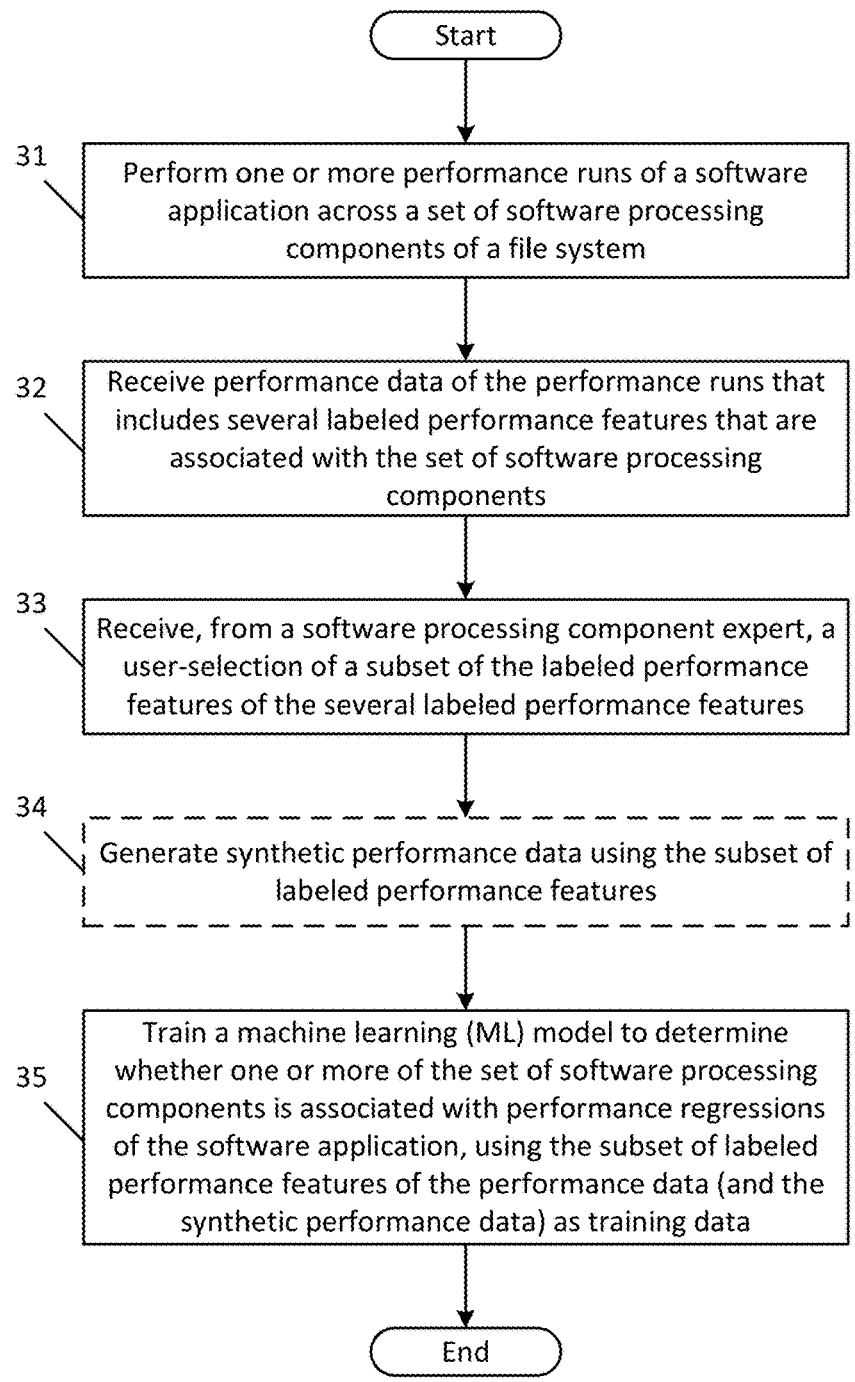
FIG. 4 is a flowchart of one embodiment of a process in which the ML model of the file system is trained for assigning performance defects according to one embodiment.
Figure 5:
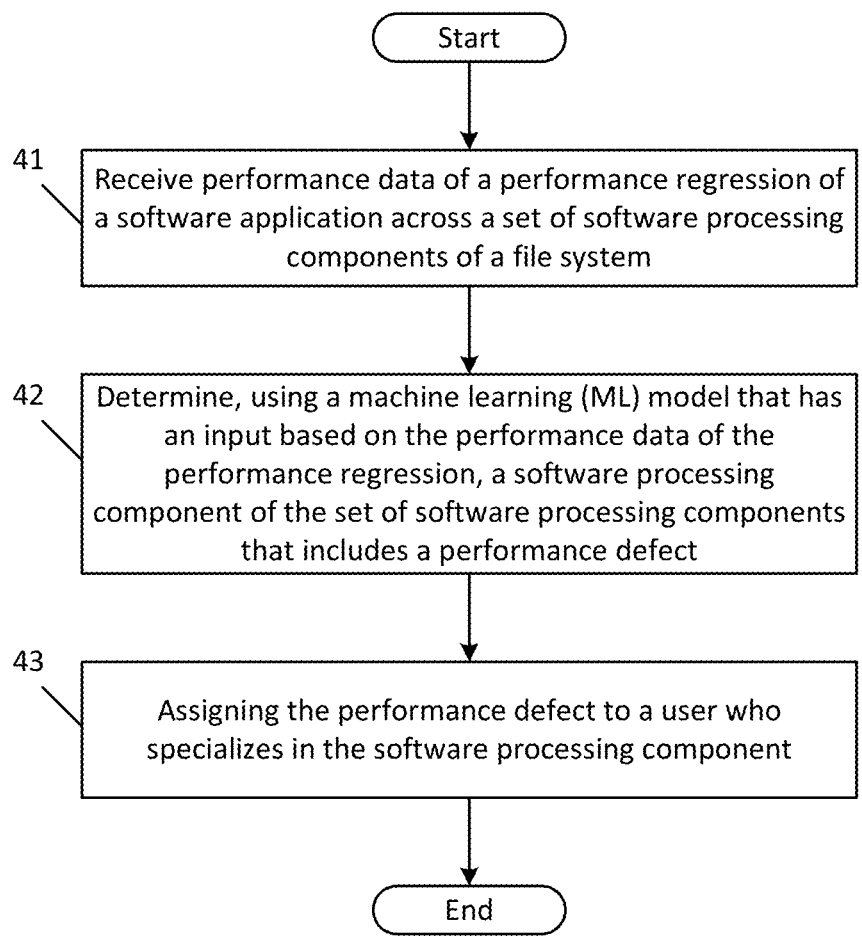
FIG. 5 is a flowchart of one embodiment of a process in which the file system assigns performance defects according to one embodiment.

FIGS. 4 and 5 are flowcharts of processes 30 and 40, respectively, that may be performed by (e.g., one or more of the operational blocks 1-6, described herein of) the file system 104. For instance, at least some of the operations of process 30 may be performed by (e.g., at least one electronic device, such as a server of) the file system that executes at least some of the operational blocks of FIG. 2, while at least some of the operations of process 40 may be performed by the file system as illustrated in FIG. 3.

FIG. 4 is a flowchart of one embodiment of the process 30 in which the ML model 6 of the file system 104 is trained for assigning performance defects according to one embodiment. The process 30 begins by the file system 104 performing one or more performance runs of a software application across a set of (one or more) software processing components of the file system (at block 31). As described herein, at least one of the performance runs may be a performance regression and/or at least one of the runs may not be a performance regression (e.g., a run in which the software components performed optimally). The file system receives performance data of the performance runs that includes several labeled performance features that are associated with the set of software processing components (at block 32). The file system receives, from a software component expert, a user-selection of a subset of the labeled performance features of the several labeled performance features (at block 33). For instance, the expert may select the subset of features via a GUI displayed on a user device (e.g., tablet computer, desktop computer, etc.), which when selected transmits the selection to the feature selector. The file system generates synthetic performance data using the subset of labeled performance features (at block 34). The file system trains a ML model to determine whether one or more of the set of software processing components is associated with performance regression of the software application, using the subset of labeled performance features of the performance data (and the synthetic performance data) as training data (at block 35).

FIG. 5 is a flowchart of one embodiment of the process 40 in which the file system 104 assigns performance defects according to one embodiment. The process 40 begins by the file system receiving performance data of a performance regression of a software application across a set of software processing components of the file system (at block 41). The file system determines, using the ML model that has an input based on the performance data of the performance regression, a software processing component of the set of software processing components that includes a performance defect (at block 42). The file system assigns the performance defect to a user who specializes in the software processing component in order for the user to analyze and solve the problem (at block 43). In one embodiment, once the user has analyzed and solved the problem (e.g., modified the source code of the software application), the file system may release an updated build of the application to users of the application.

Some embodiments may perform variations to the processes 30 and 40 described in FIGS. 4 and 5, respectively. For example, the specific operations of at least some of the processes may not be performed in the exact order shown and described. The specific operations may not be performed in one continuous series of operations and different specific operations may be performed in different embodiments. For instance, operations associated with blocks with dashed borders may be optional and not be performed within the processes. For example, process 30 in FIG. 4 may omit the step of generating the synthetic performance data at block 34. As a result, the file system may train the ML model using only the performance data of the user-selected labeled performance features, as described herein.

Figure 6:
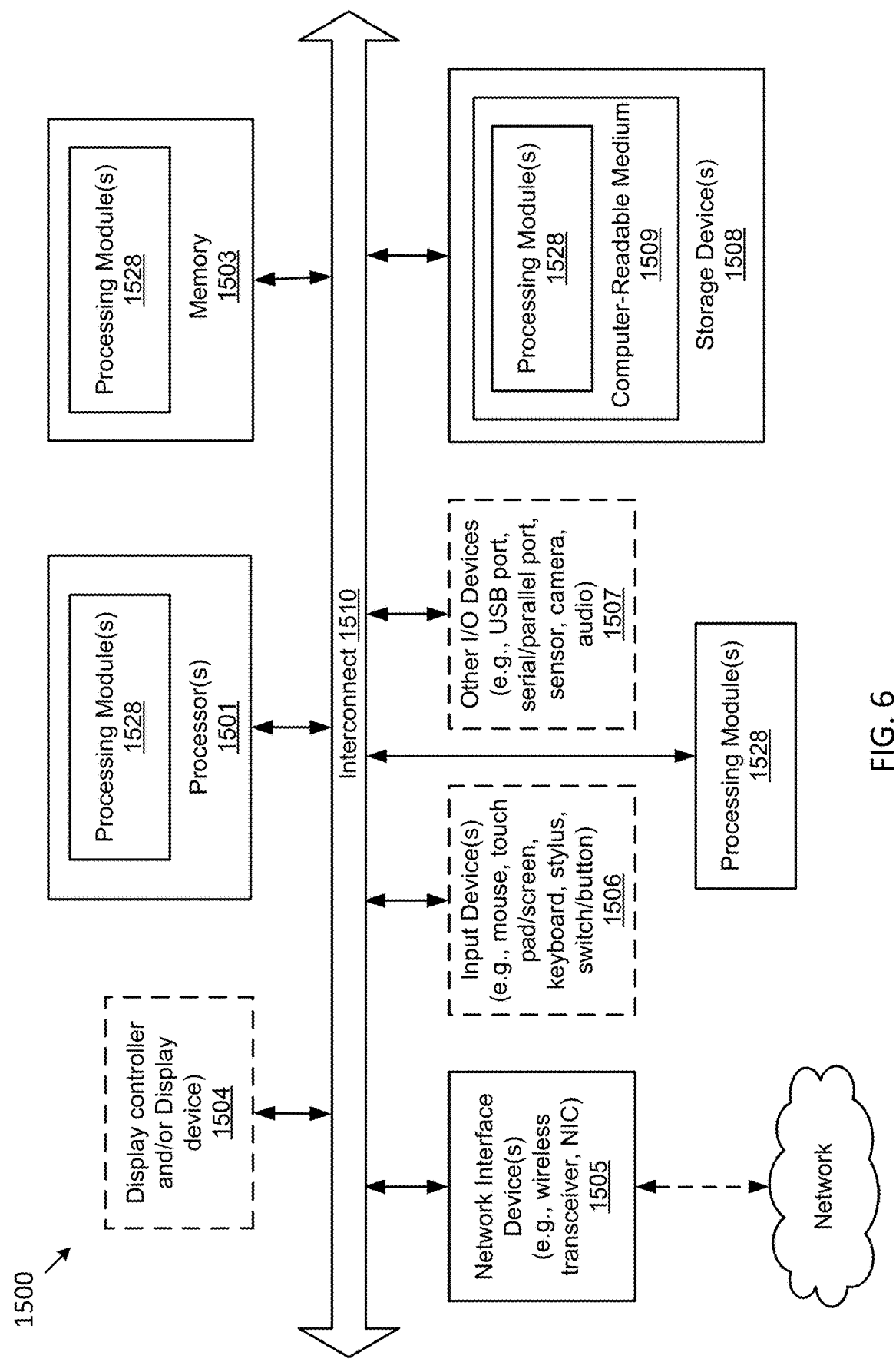
FIG. 6 is a block diagram illustrating a file system, according to an embodiment of the application.

FIG. 6 is a block diagram illustrating an example of a file system which may be used to determine and assign performance defects for software applications with one embodiment of the invention. For example, system 1500 may represent any file system described above (e.g., file system 104) performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high-level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, the software application 1, performance scheduler 2, the software processing components 3, the feature selector 4, the performance data synthesizer 5, the ML model 6, the component team assigner 51, and/or the performance database 8, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

In one embodiment, at least some of the elements described in this figure may include at least some of the processing resources 5 illustrated in FIG. 1. For example, the processor(s) 1501 may include process(s) 11, memory 1503 may include memory 12, and/or the network interface device(s) 1505 may include networking 13.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some embodiments, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some embodiments, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method comprising:
    performing a set of performance runs of a software application across a set of software processing components of a file system, wherein the set of performance runs comprises a performance regression;
    receiving performance data of the set of performance runs, wherein the performance data comprises a plurality of labeled performance features that are associated with the set of software processing components;
    receiving, from a user device, a user-selection of a subset of labeled performance features of the plurality of labeled performance features via a user interface displayed on the user device, wherein the user interface includes the plurality of labeled performance features; and
    training a machine learning (ML) model to determine whether one or more of the set of software processing components of the file system is associated with performance defects of the software application, using the subset of labeled performance features of the performance data as training data, and assign the one or more of the set of software processing components of the file system to one or more users when the ML model determines that the one or more of the set of software processing components of the file system is associated with the performance defects.

2. The method of claim 1, wherein at least one of the set of performance runs of the software application is a performance defect in which one or more software processing components of the set of software processing components performed below a performance threshold.

3. The method of claim 2, wherein the subset of labeled performance features are associated with a subset of the one or more software processing components that are responsible for the performance defect.

4. The method of claim 1 further comprising generating synthetic performance data using the subset of labeled performance features, wherein the training data further comprises the synthetic performance data.

5. The method of claim 4, wherein the user-selection of the subset of labeled performance features reduces the performance data used as training data by removing data associated with the unselected labeled performance features, wherein the synthetic performance data includes more data of the subset of labeled performance features than the reduced performance data.

6. The method of claim 4 further comprising
    identifying labeled performance features of the subset from a performance run of the set of performance runs that is not a performance defect of the software application,
    wherein generating the synthetic performance data comprises varying each of the identified labeled performance features from the performance run within a predefined range.

7. The method of claim 1, wherein the ML model is one of a decision tree, a random forest, a recurrent neural network (RNN), a long short term memory (LSTM) neural network, and a multi-head attention.

8. The method of claim 1, wherein at least one labeled performance feature indicates a usage of a resource of an electronic device by a software processing component during a performance run of the software application.

9. A non-transitory machine-readable medium having instructions stored therein, which when executed by a processor, cause the processor to perform operations, the operations comprising:
    performing a set of performance runs of a software application across a set of software processing components of a file system, wherein the set of performance runs comprises a performance regression;
    receiving performance data of the set of performance runs, wherein the performance data comprises a plurality of labeled performance features that are associated with the set of software processing components;
    receiving, from a user device, a user-selection of a subset of the labeled performance features of the plurality of labeled performance features via a user interface displayed on the user device, wherein the user interface includes the plurality of labeled performance features; and
    training a machine learning (ML) model to determine whether one or more of the set of software processing components of the file system is associated with performance defects of the software application, using the subset of labeled performance features of the performance data as training data, and assign the one or more of the set of software processing components of the file system to one or more users when the ML model determines that the one or more of the set of software processing components of the file system is associated with the performance defects.

10. The non-transitory machine-readable medium of claim 9, wherein at least one of the set of performance runs of the software application is a performance defect in which one or more software processing components of the set of software processing components performed below a performance threshold.

11. The non-transitory machine-readable medium of claim 10, wherein the subset of labeled performance features are associated with a subset of the one or more software processing components that are responsible for the performance defect.

12. The non-transitory machine-readable medium of claim 9, wherein the operations further comprise generating synthetic performance data using the subset of labeled performance features, wherein the training data further comprises the synthetic performance data.

13. The non-transitory machine-readable medium of claim 12, wherein the user-selection of the subset of labeled performance features reduces the performance data used as training data by removing data associated with the unselected labeled performance features, wherein the synthetic performance data includes more data of the subset of labeled performance features than the reduced performance data.

14. The non-transitory machine-readable medium of claim 12, wherein the operations further comprise:
   identifying labeled performance features of the subset from a performance run of the set of performance runs that is not a performance defect of the software application,
   wherein generating the synthetic performance data comprises varying each of the identified labeled performance features from the performance run within a predefined range.

15. The non-transitory machine-readable medium of claim 9, wherein the ML model is one of a decision tree, a random forest, a recurrent neural network (RNN), a long short term memory (LSTM) neural network, and a multihead attention.

16. The non-transitory machine-readable medium of claim 9, wherein at least one labeled performance feature indicates a usage of a resource of an electronic device by a software processing component during a performance run of the software application.

17. A method comprising:
   receiving performance data of a performance defect of a software application across a set of software processing components of a file system; and
   determining, using a machine learning (ML) model that has an input based on the performance data of the performance defect, a software processing component of the set of software processing components that has a performance defect,
   wherein the performance data includes a plurality of labeled performance features that are associated with the set of software processing components,
   wherein the ML model has been trained, using a subset of the labeled performance features that have been user-selected, via a user interface displayed on a user device, from the plurality of labeled performance features as training data, to determine whether one or more of the set of software processing components of the file system is associated with performance defects of the software application, and assign the one or more of the set of software processing components of the file system to one or more users when the ML model determines that the one or more of the set of software processing components of the file system is associated with the performance defects,
   wherein the user interface includes the plurality of labeled performance features.

18. The method of claim 17, wherein the subset of labeled performance features are associated with a subset of software processing components, wherein the determined software processing component is a part of the subset.

19. The method of claim 17, wherein the set of software processing components comprises at least one of a protocol layer, a file manager, a content store, a segment store, a container manager, and a storage layer.

20. The method of claim 17 further comprises assigning the performance defect to a user who specializes in the software processing component.

* * * * *